Figure 11:
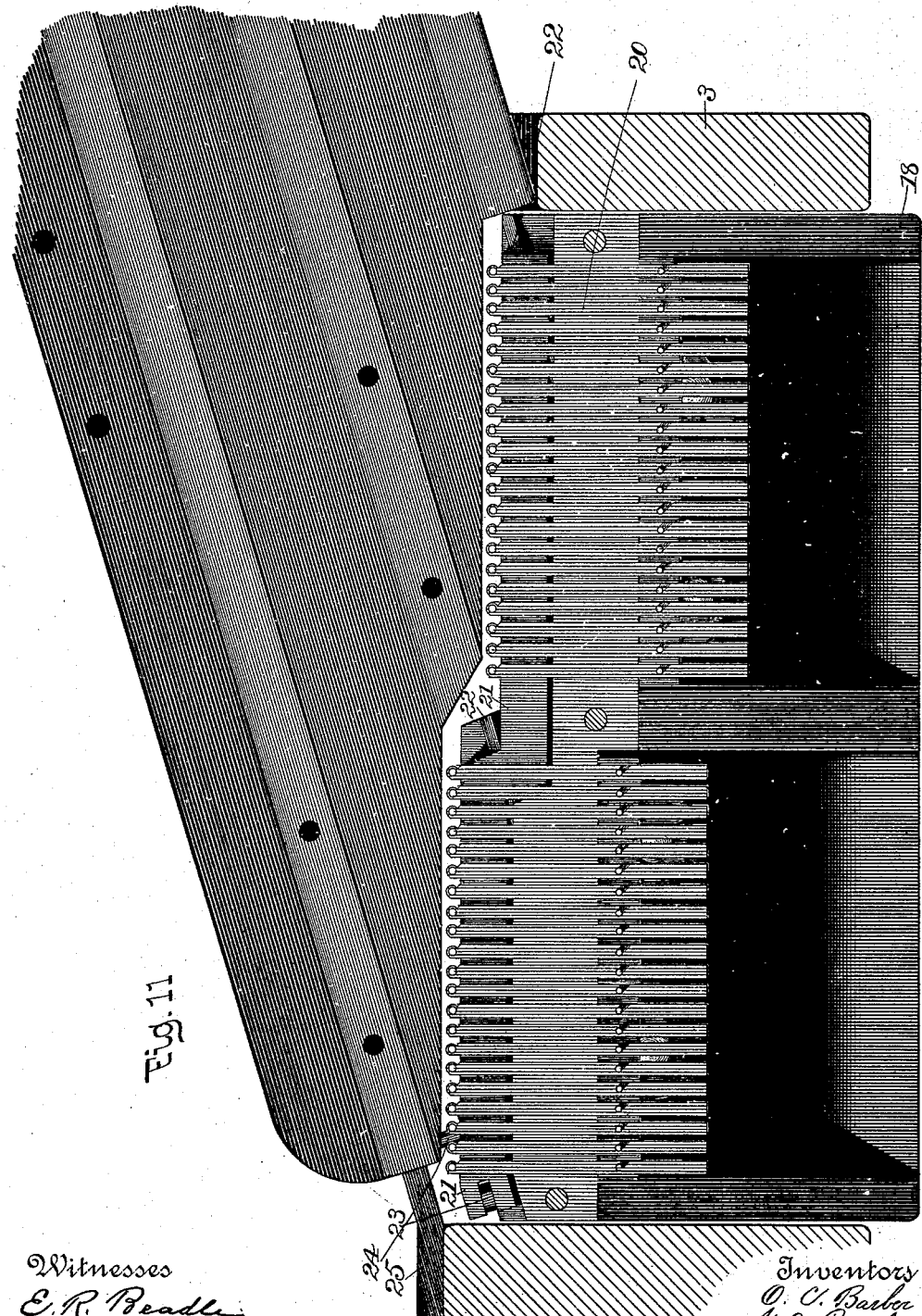

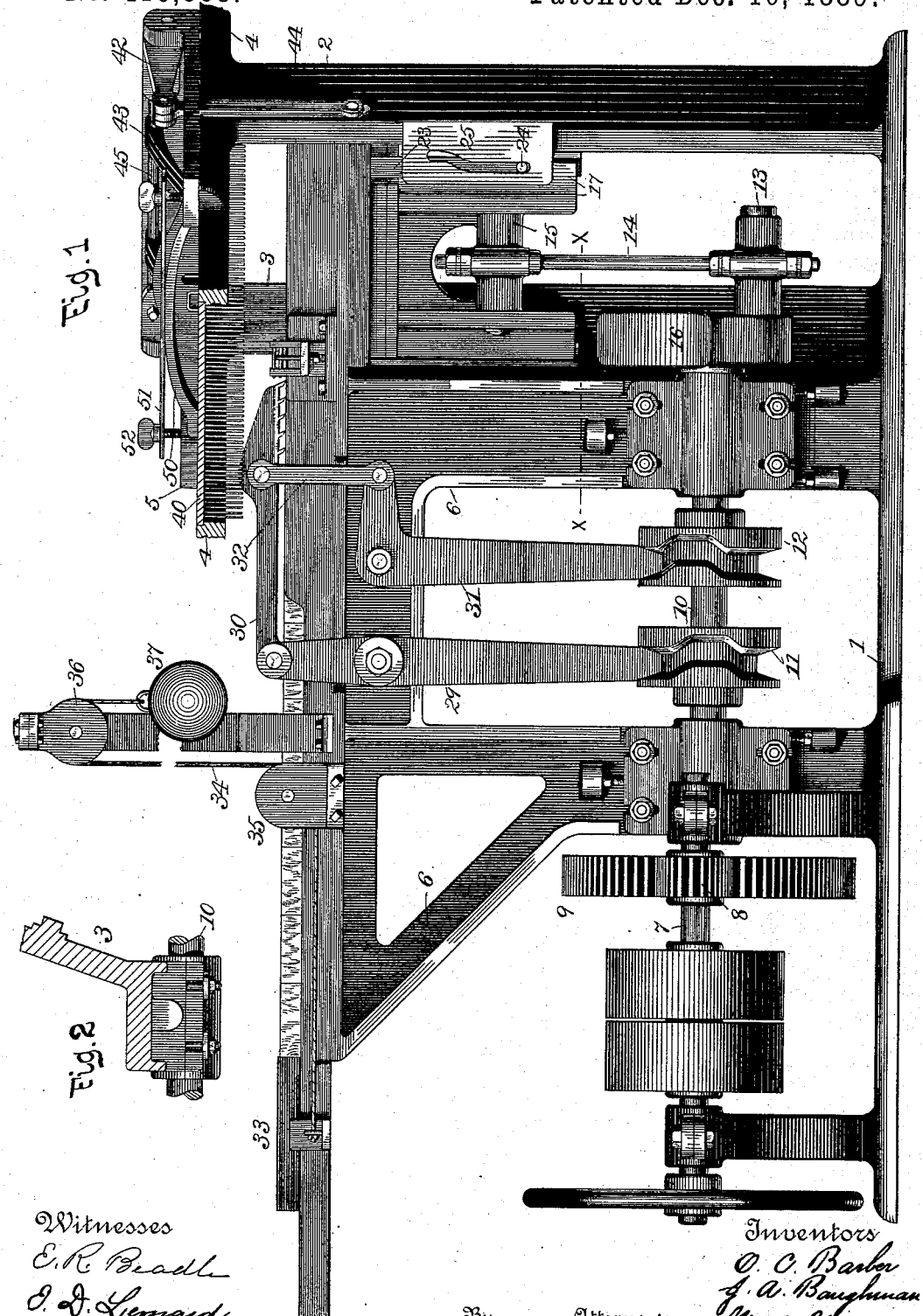

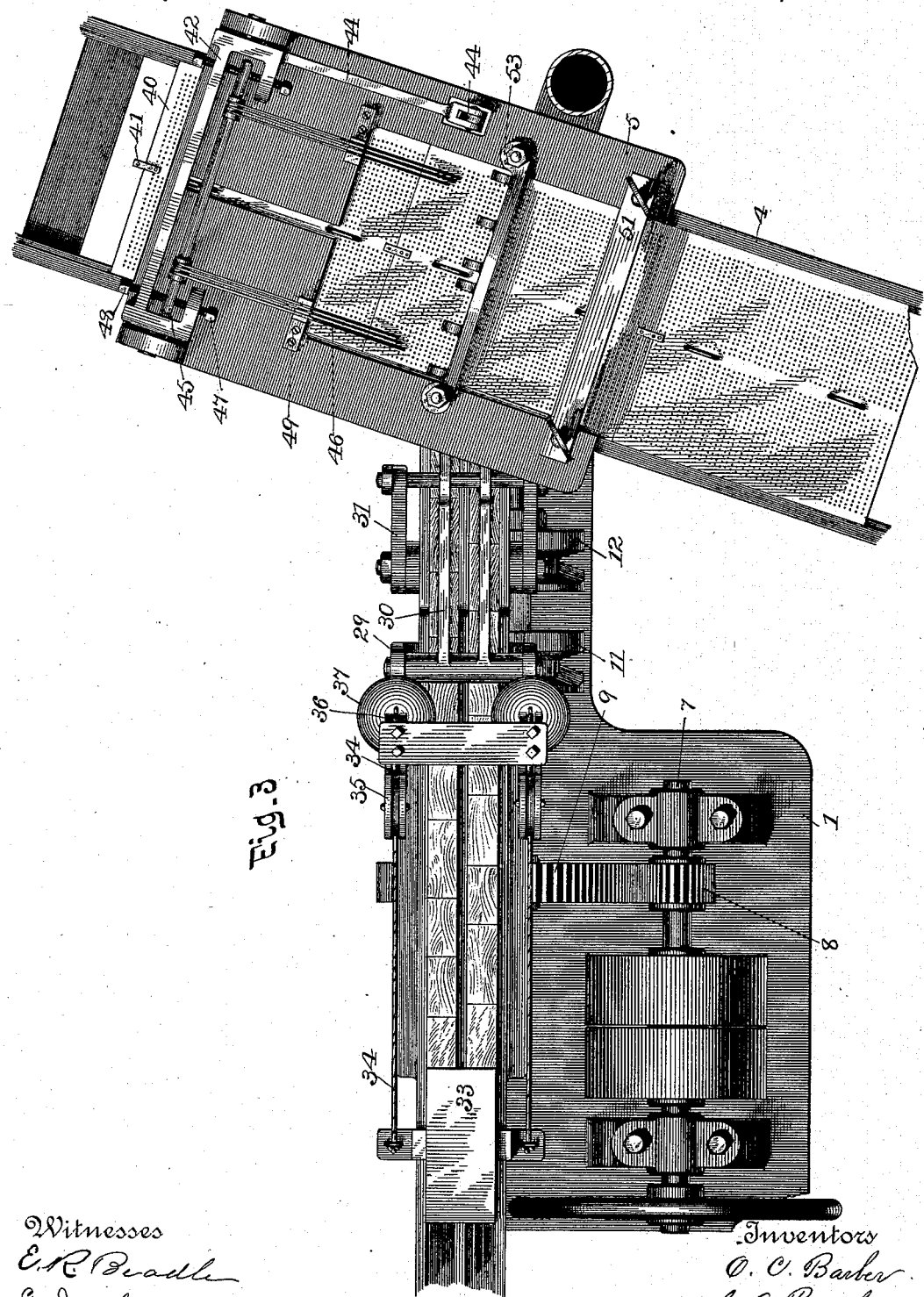

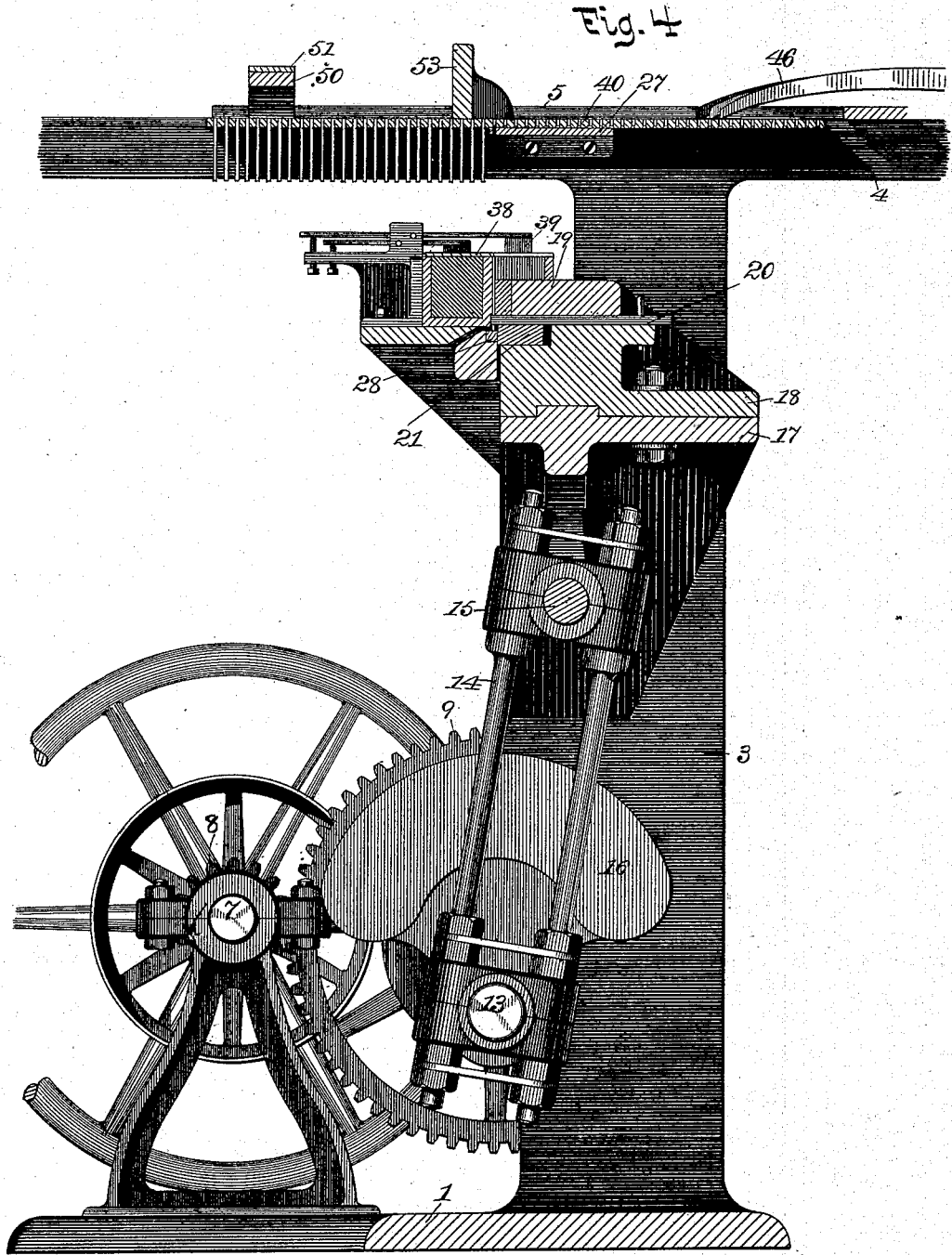

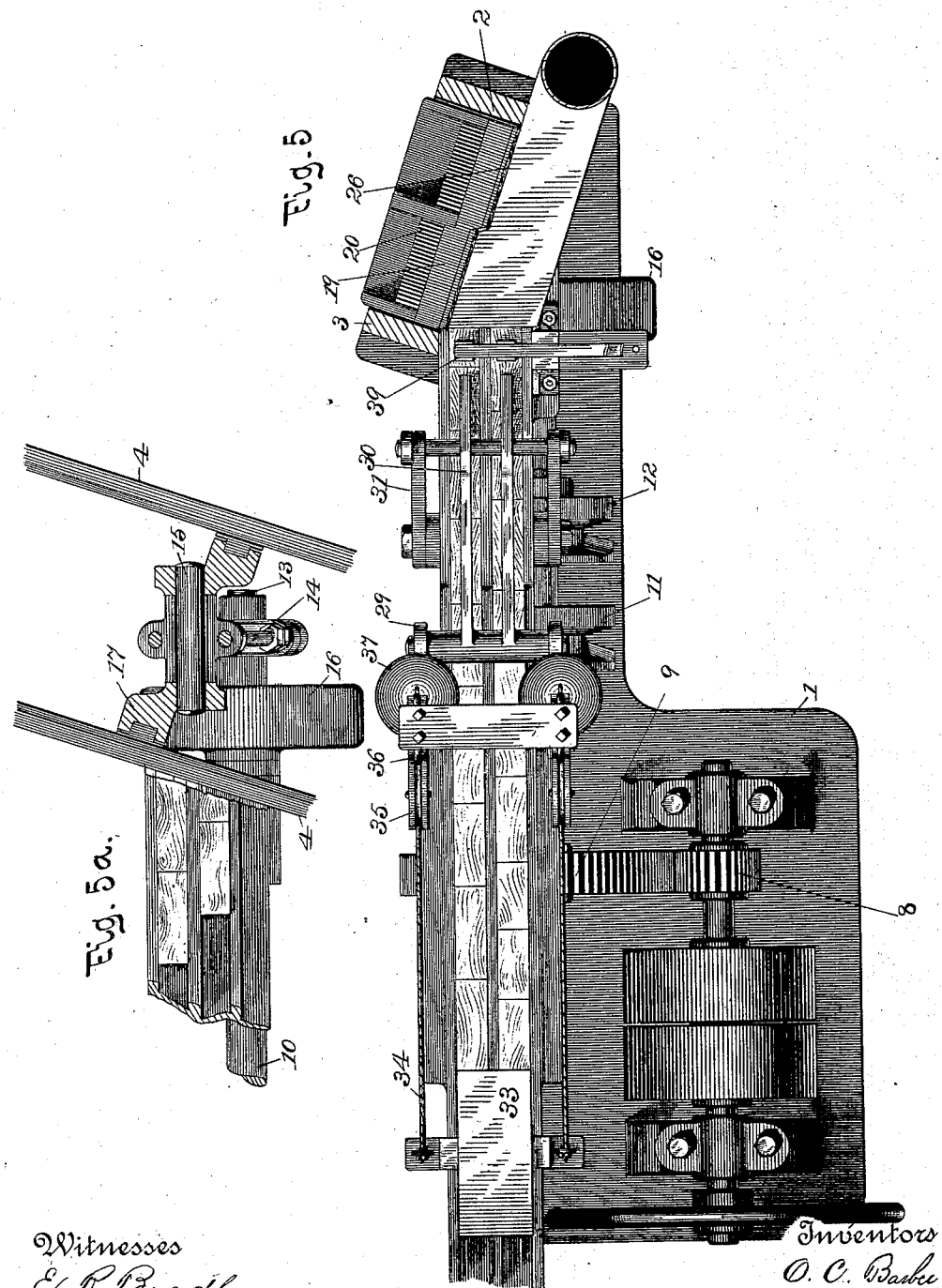

(No Model.) 14 Sheets—Sheet 5.
O. C. BARBER, J. A. BAUGHMAN & McC. YOUNG.
MACHINE FOR MAKING MATCH STICKS.
No. 416,888. Patented Dec. 10, 1889.
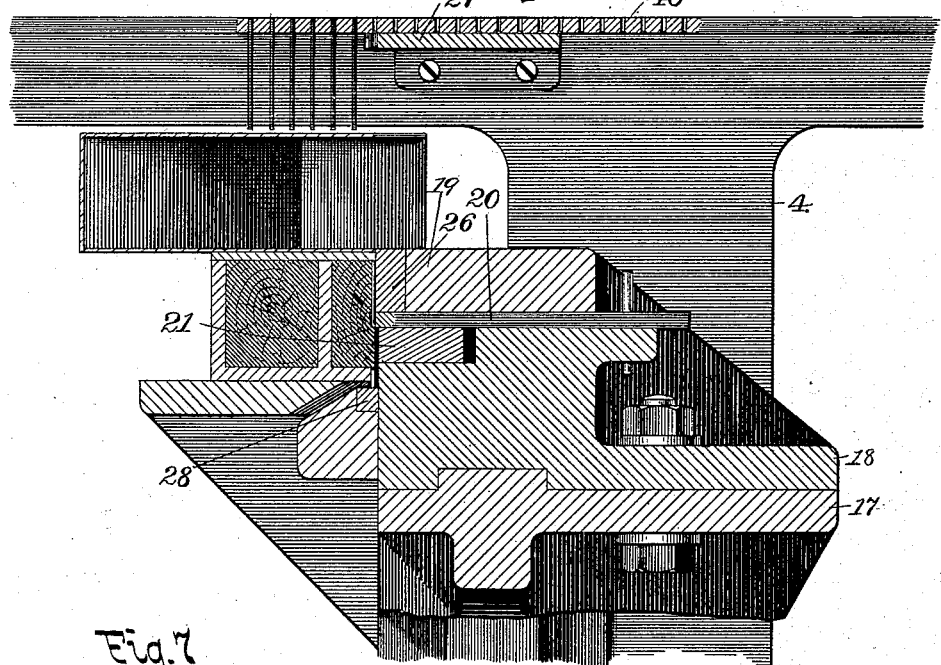
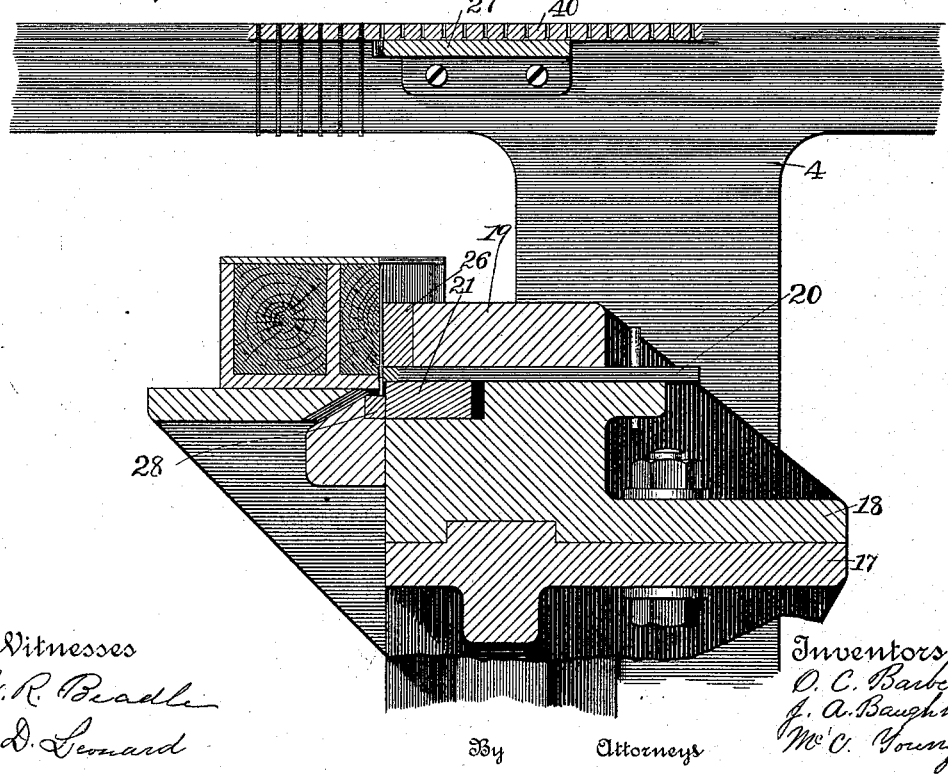
Witnesses
E. R. Beadle
O. D. Lenard
Inventors
O. C. Barber
J. A. Baughman
McC. Young
By Attorneys
H. W. Beadle & Co.

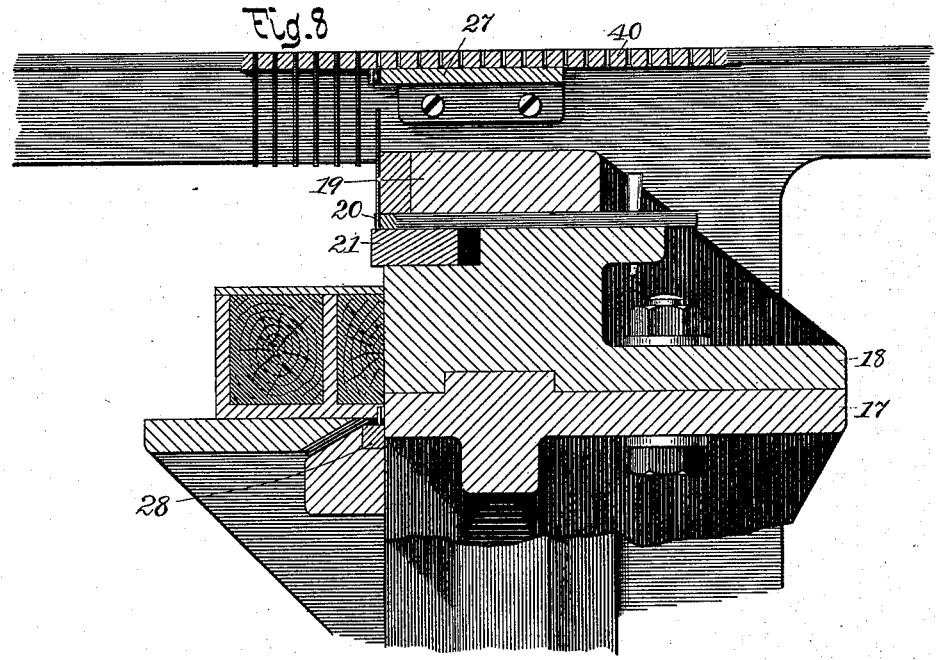
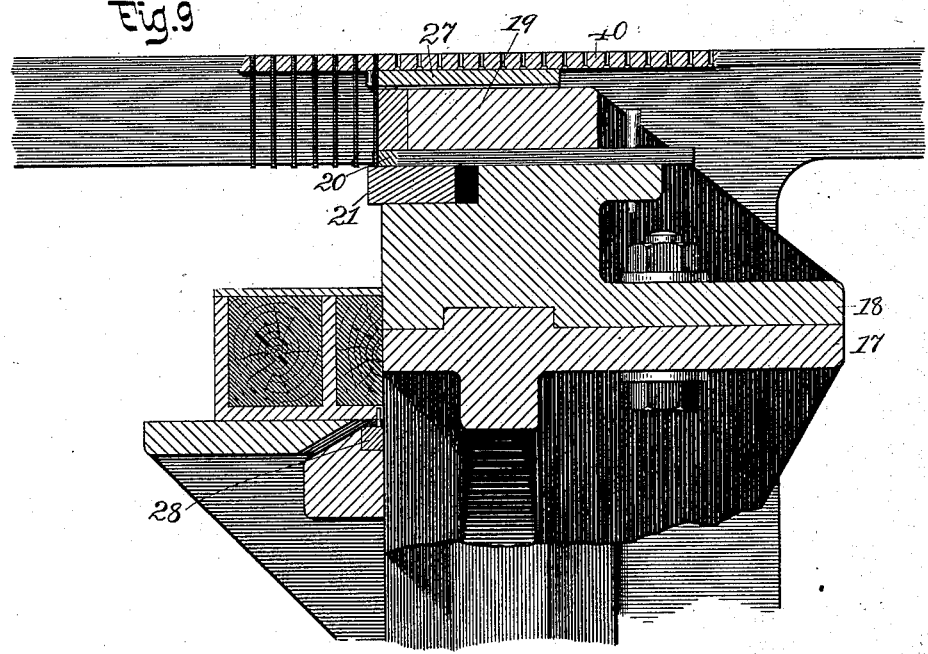

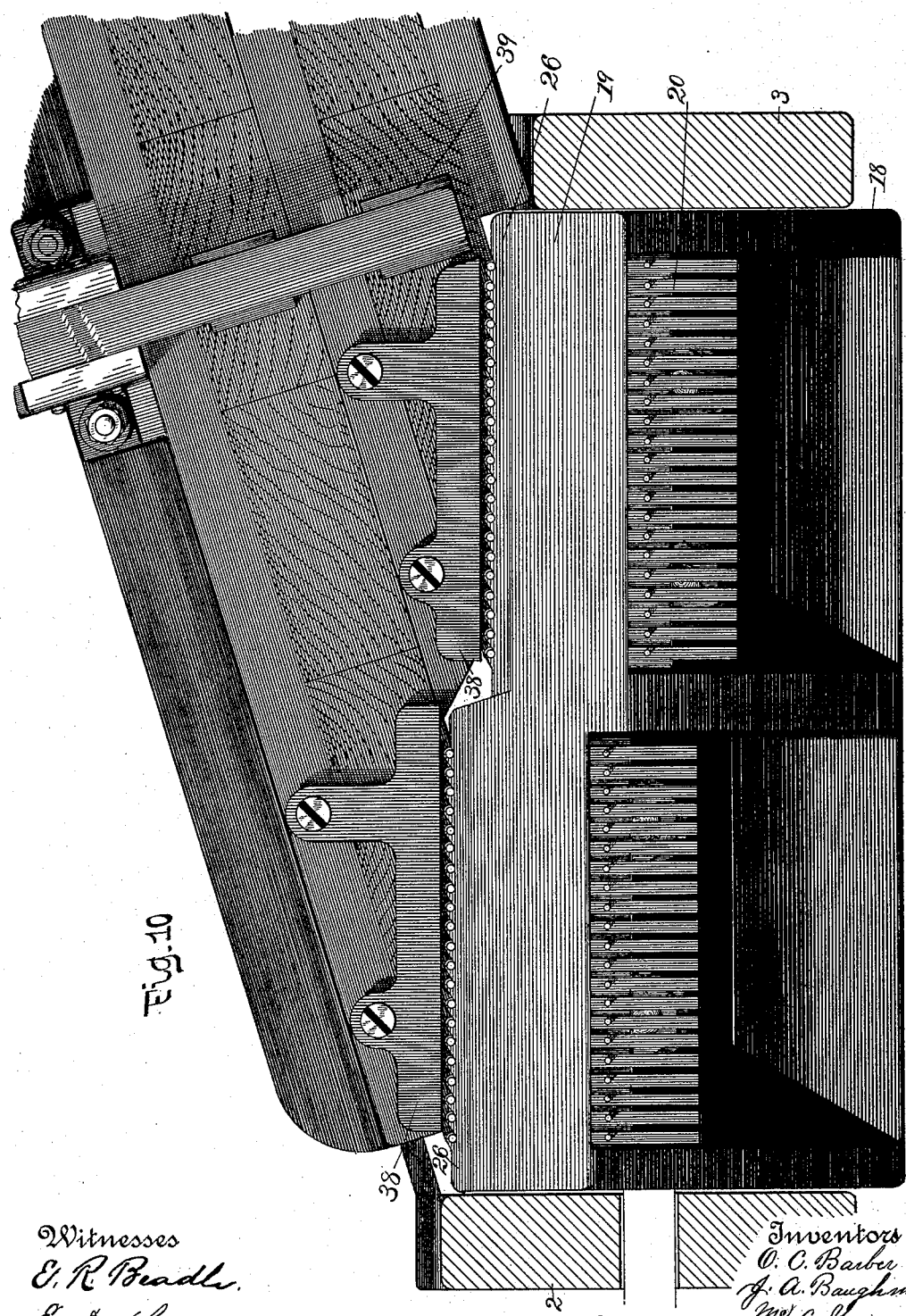

(No Model.) 14 Sheets—Sheet 8.

O. C. BARBER, J. A. BAUGHMAN & McC. YOUNG.
MACHINE FOR MAKING MATCH STICKS.

No. 416,888. Patented Dec. 10, 1889.

Witnesses
E. R. Beadle
C. D. Leonard

Inventors
O. C. Barber
J. A. Baughman
McC. Young
By H. W. Beadle & Co.
Attorneys

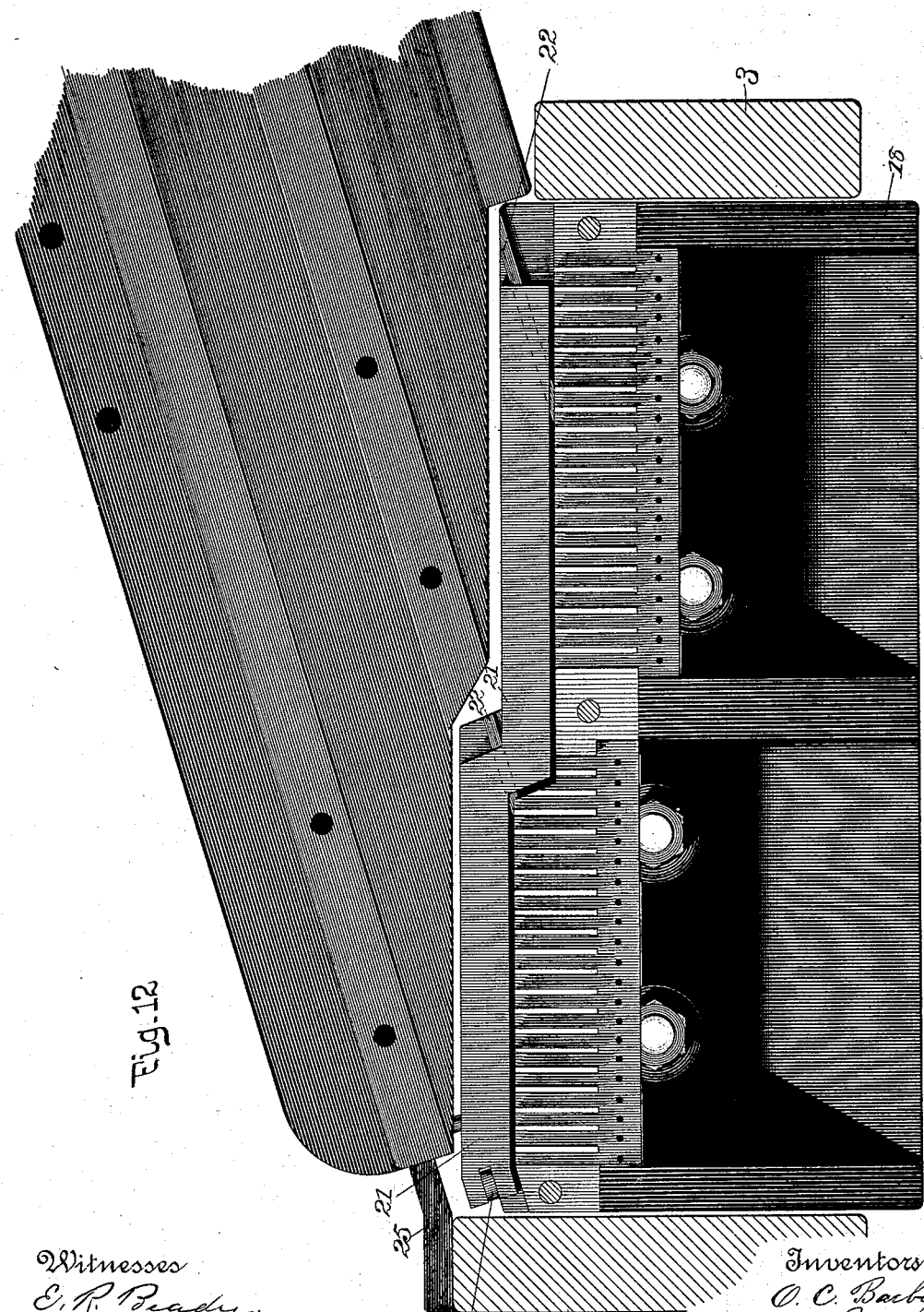

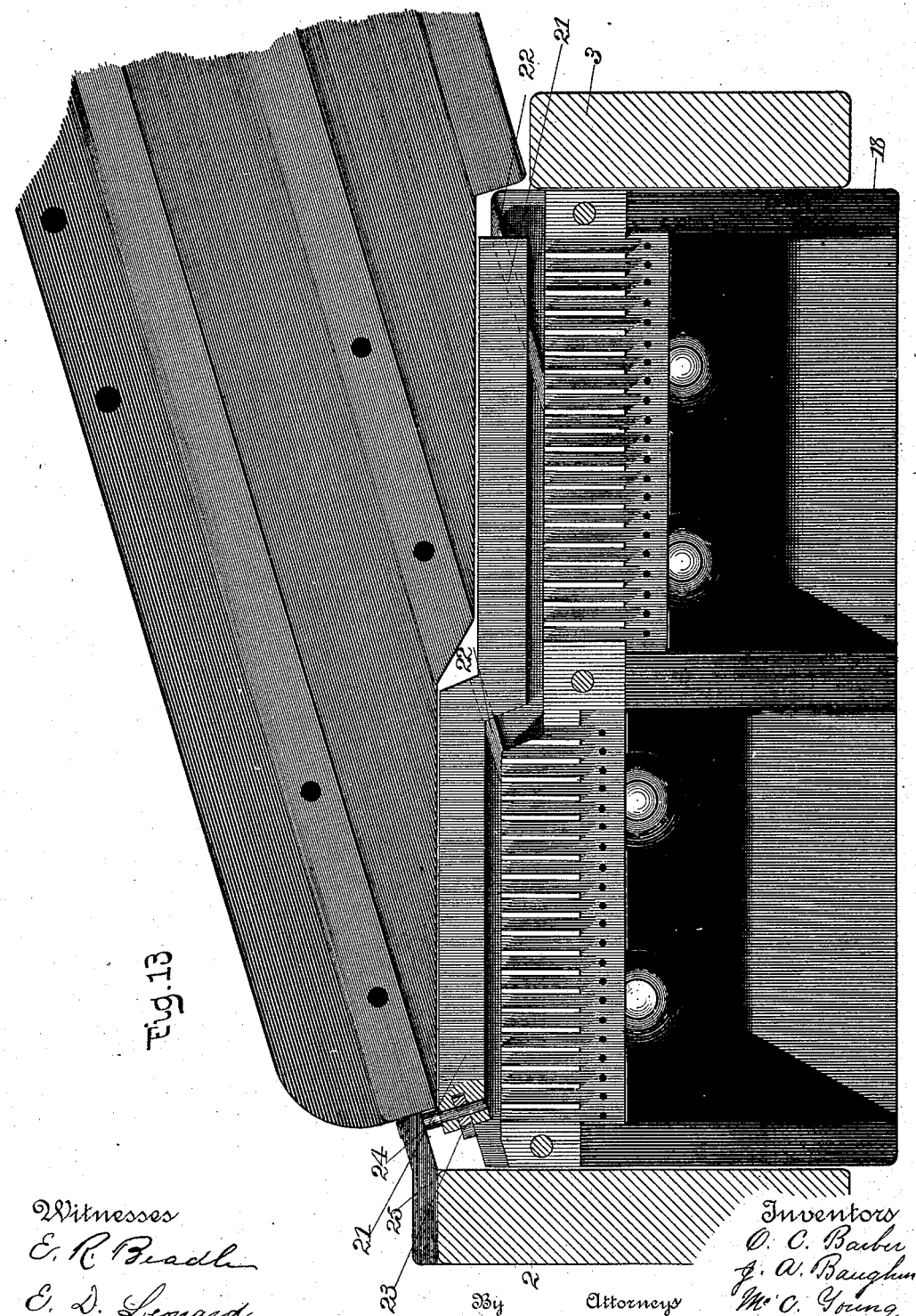

(No Model.) 14 Sheets—Sheet 11.
O. C. BARBER, J. A. BAUGHMAN & McC. YOUNG.
MACHINE FOR MAKING MATCH STICKS.
No. 416,888. Patented Dec. 10, 1889.
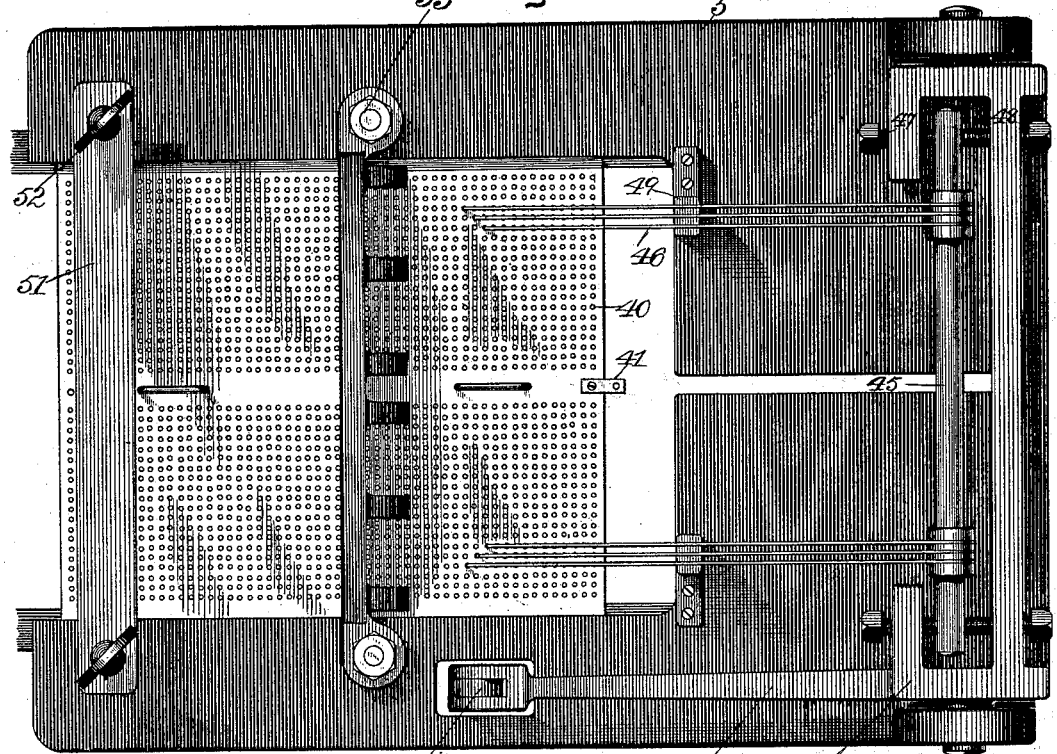
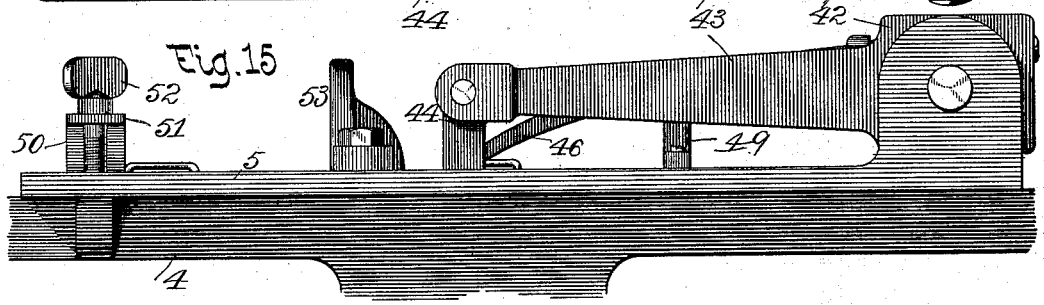
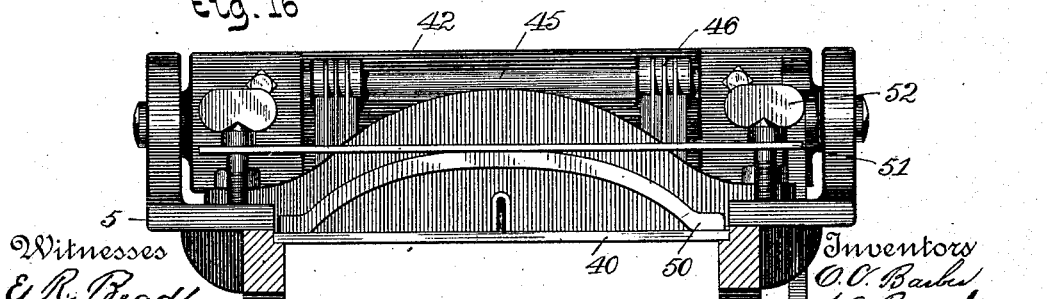

(No Model.) 14 Sheets—Sheet 12.
O. C. BARBER, J. A. BAUGHMAN & McC. YOUNG.
MACHINE FOR MAKING MATCH STICKS.
No. 416,888. Patented Dec. 10, 1889.
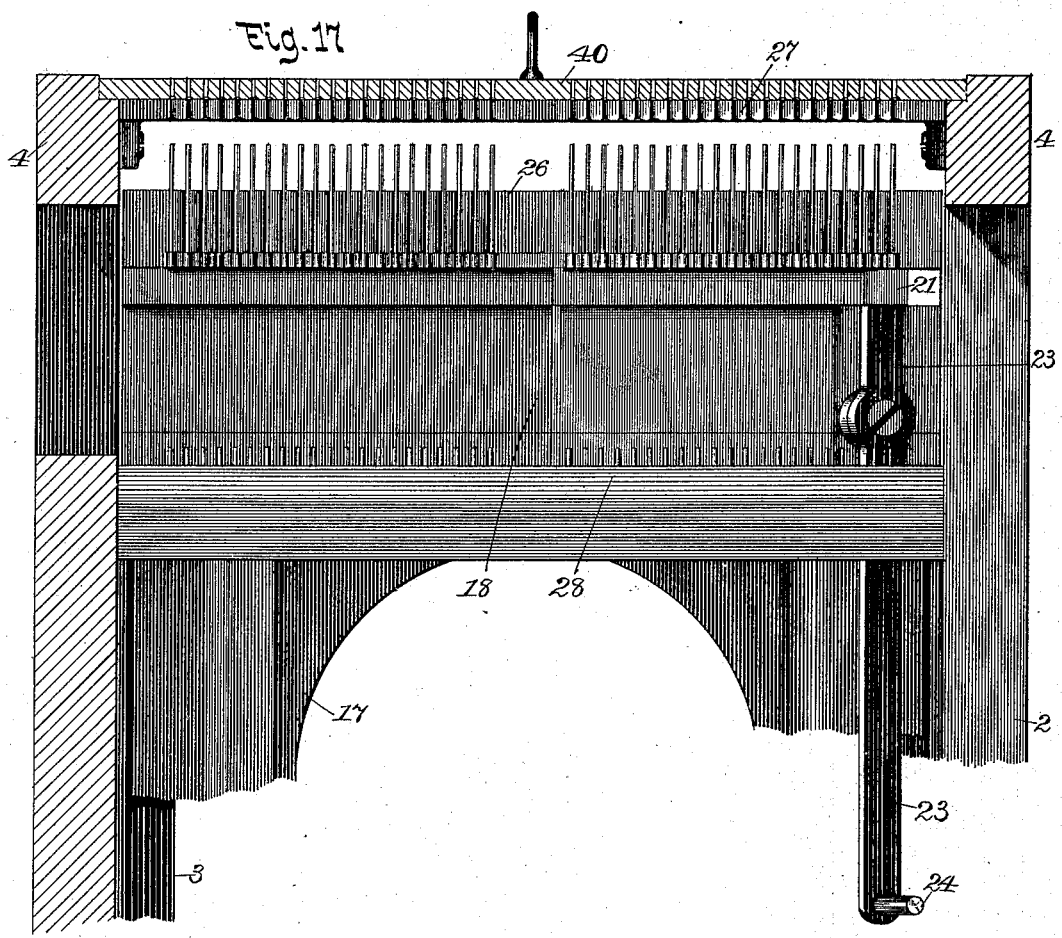
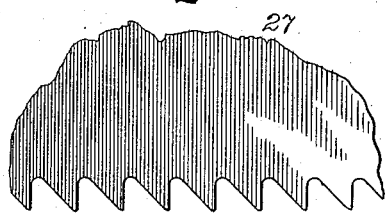
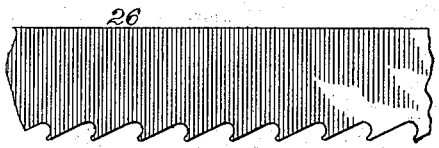

(No Model.) 14 Sheets—Sheet 13.
O. C. BARBER, J. A. BAUGHMAN & McC. YOUNG.
MACHINE FOR MAKING MATCH STICKS.
No. 416,888. Patented Dec. 10, 1889.
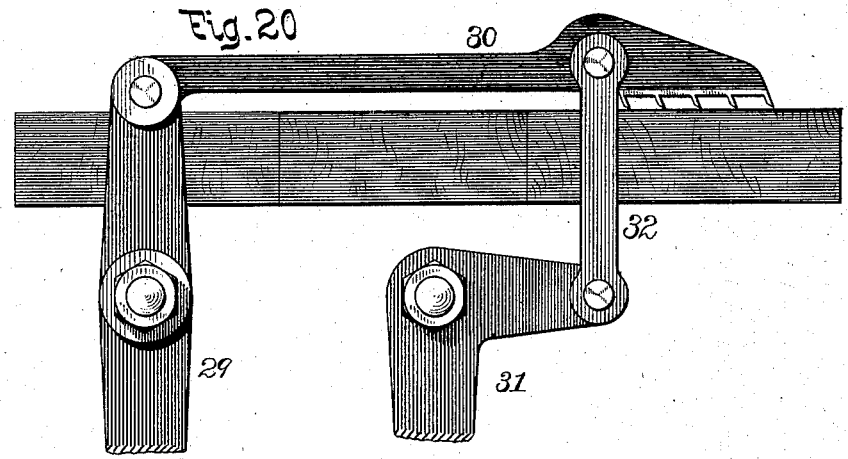
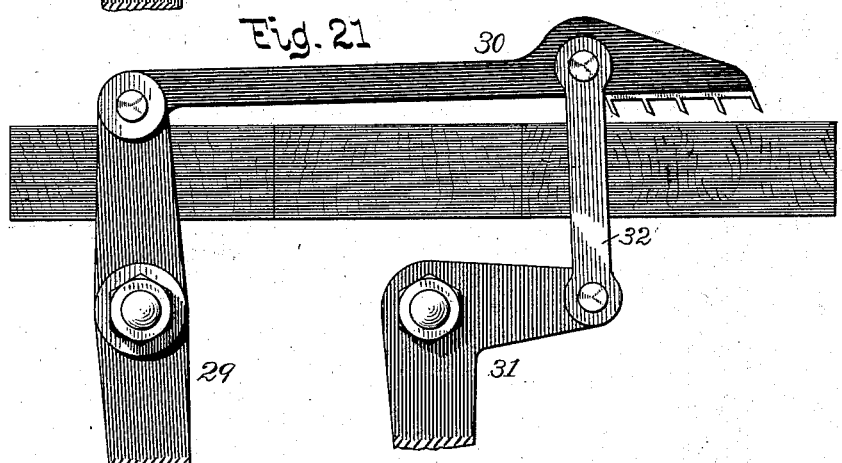
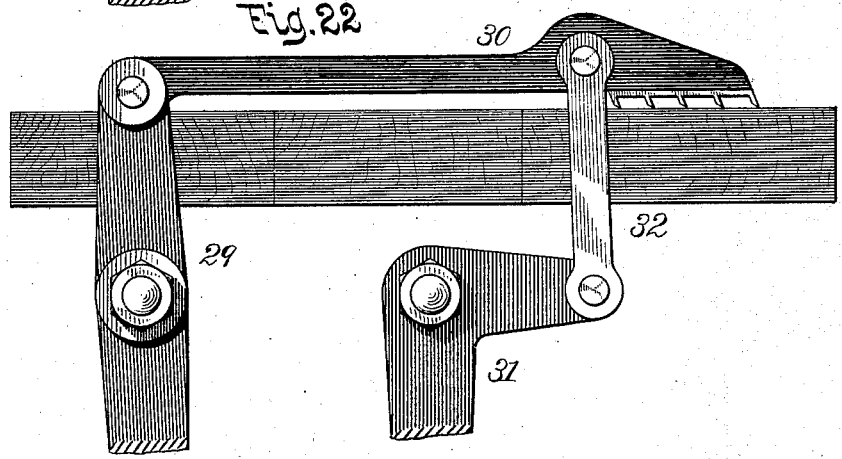

(No Model.) 14 Sheets—Sheet 14.
O. C. BARBER, J. A. BAUGHMAN & McC. YOUNG.
MACHINE FOR MAKING MATCH STICKS.
No. 416,888. Patented Dec. 10, 1889.
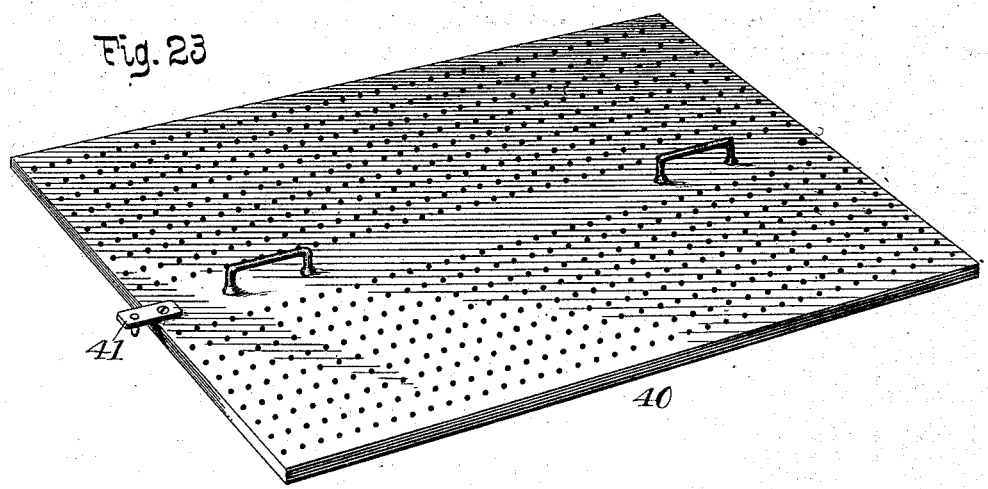
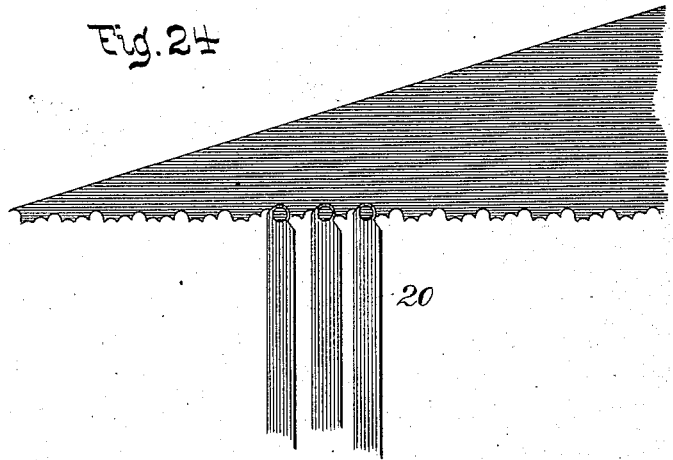
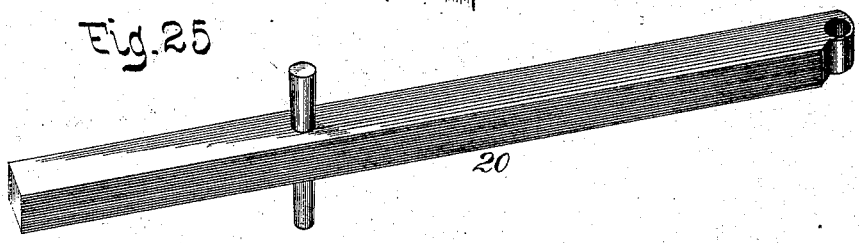

UNITED STATES PATENT OFFICE.

OHIO C. BARBER AND JOSEPH A. BAUGHMAN, OF AKRON, OHIO, AND McCLINTOCK YOUNG, OF FREDERICK, MARYLAND, ASSIGNORS TO THE DIAMOND MATCH COMPANY, OF OHIO.

MACHINE FOR MAKING MATCH-STICKS.

SPECIFICATION forming part of Letters Patent No. 416,888, dated December 10, 1889.

Application filed April 9, 1889. Serial No. 306,572. (No model.)

*To all whom it may concern:*

Be it known that we, OHIO C. BARBER and JOSEPH A. BAUGHMAN, citizens of the United States, residing at Akron, county of Summit, and State of Ohio, and McCLINTOCK YOUNG, a citizen of the United States, residing at Frederick, county of Frederick, and State of Maryland, have invented new and useful Improvements in Machines for Making Match-Sticks, of which the following is a specification.

This invention is a machine for cutting match-sticks from the prepared blocks and inserting the sticks, when cut, into perforated plates, which plates are then removed and transferred to another point for subjection to the dipping process.

It consists in certain combinations of elements, as will be fully described hereinafter.

In the drawings, Figure 1 represents the front elevation of the machine; Fig. 2, a sectional view on the line *x x*, Fig. 1; Fig. 3, a plan view; Fig. 4, a longitudinal section through the cutter-head; Fig. 5, a plan view with the track-plate removed; Fig. 5ª, a plan view, partially in section; Fig. 6, a sectional view through the cutter-head, showing the knives in the act of cutting the sticks from the block; Fig. 7, a similar view with the cutting action completed; Fig. 8, a similar view with the abutment-block for sustaining the match-sticks in its advanced position and the cutter-head in the act of making its upward movement for the purpose of inserting the cut sticks into the perforated plate; Fig. 9, a similar view with the cutter-head in its extreme upward position; Fig. 10, a plan view of the cutter-head with the grooved supporting-plates in position; Fig. 11, a plan view of the cutter-head without the grooved supporting-plates; Fig. 12, a similar view with the knives removed; Fig. 13, a similar view showing the abutment-block for sustaining the match-sticks while subjected to the thrust action of the cutter-head; Fig. 14, a plan view; Fig. 15, a side view; Fig. 16, a front view of the upper plate 5 and the mechanisms for feeding the perforated plates; Fig. 17, a front view of the cutter-head, the abutment-block, the grooved supporting-plates, and the upper guide-plate, with the lever for advancing the abutment-block; Fig. 18, a partial plan view of the upper guide-plate; Fig. 19, a partial plan view of the grooved supporting-plate; Figs. 20, 21, and 22, enlarged views of the mechanism for feeding the blocks; Fig. 23, a perspective view of one of the perforated plates; Fig. 24, a partial plan view of the cutter-knives and blocks, and Fig. 25 a perspective view of one of the cutter-knives.

To enable others skilled in the art to make and use our improved machine, we will proceed to describe fully its construction and manner of operation.

For convenience and clearness the description will be given under several heads, as follows: First, the frame-work; second, the shafts and main actuating parts; third, the mechanism for actuating the cutter-head and the cutter-head proper; fourth, the abutment-block for sustaining the match-sticks in the upward thrust of the cutter-head and the mechanism for actuating the same; fifth, the mechanism for feeding the blocks; sixth, the independent perforated plates and the mechanism for feeding the same.

*First, the frame-work.*—1, Fig. 1, represents the foundation-bed or base-plate of the machine, and 2 and 3 vertical standards having the side beams 4 4, adapted to support the upper plate 5, as shown in Figs. 14 and 15. 6 represents an extension of special construction, which serves to support the extended portion of the machine.

*Second, the shafts and main actuating parts.*—7, Figs. 1 and 3, represents the driving-shaft supported in any proper bearings, upon which is located the fly-wheel and fast and loose pulleys in any proper manner. 8 represents a pinion upon the driving-shaft, which engages with the gear-wheel 9 upon the cam-shaft 10, as shown. 11 and 12 represent cams upon the shaft 10, which cams are employed with the block-feeding mechanism, as hereinafter described.

*Third, the mechanism for actuating the cutter-head.*—13, Figs. 1 and 4, represents a crank-pin on the end of the cam-shaft 10; 14 14, connecting-rods, and 15 a shaft upon the cutter-head, as shown. 16 represents a counterbalance-weight. 17 represents a base-plate upon the cutter-head, which is adapted for vertical movement between the standards 2 and 3 in any proper manner, or as shown in Fig. 5ª. 18 represents a frame-block upon which the cutters are supported, as shown. 19, Figs. 4 and 10, represents a cover-block of the knives or cutters. 20, Figs. 10, 24, and 25, represents the knives, which are held in socket-plates, as shown in Figs. 1, 12, and 13.

*Fourth, the abutment-block for sustaining the match-sticks in the upward thrust of the cutter-head and the mechanism for actuating the same.*—21, Figs. 4, 8, 12, and 17, represents the abutment-block, which is employed for sustaining the base ends of the match-sticks when, under the action of the cutter-head, they are thrust into the perforated plate. 22, Fig. 12, represents ways of any proper construction, upon which ways the abutment-blocks rest. 23, Figs. 12 and 17, represents a lever attached to one end of the abutment-block, as shown. 24, Figs. 1 and 17, represents a pin upon the end of the lever; 25, Fig. 1, a cam-plate having a slot, as shown, by means of which slot the lever is properly actuated to move the abutment-block at the proper times into and out of its operative positions. 26, Figs. 17 and 19, represents a supporting-plate, which is provided with grooves adapted to support the match-sticks throughout a large portion of their length. 27, Figs. 17 and 18, represents an upper plate adapted to guide the upper ends of the match-sticks into the beveled openings of the perforated plates. 28, Figs. 6 and 17, represents a block provided with pins which are adapted to enter the openings in the knives at the end of the cutting action. The joint operation of the abutment-block and the cutter-head is as follows: By means of the actuating mechanism a vertical movement is imparted to the cutter-head, in the manner well understood. By the downward movement of the head the knives are caused to cut the sticks from the blocks, as shown in Fig. 6. At the end of the cutting action the knives are caused to move over the pins, and by this means the match-sticks are entered into the opening of the knives far enough to prevent their lower ends from coming in contact with the abutment-block when it moves into its operative position. The position of the parts when the knives are completing the cutting action is shown in Fig. 7. The position of the parts when the abutment-block has moved into its operative position and the cutter-head is about to finish its upward movement is shown in Fig. 8. The position of the parts when the cutter-head has entered the line of sticks cut from the block into the proper series of openings in the perforated plate is shown in Fig. 9.

*Fifth, the mechanism for feeding the blocks.*—11 represents the cam before referred to on the shaft 10, and 29, Fig. 20, a pivoted lever which at one end is adapted to be properly acted upon by the cam 11, as shown. 30, Figs. 1 and 20, represents a feeding-bar attached at one end to the upper end of the lever 29, which bar is provided with teeth, as shown. 12 represents a cam on shaft 10, and 31 a pivoted bell-crank lever, one end of which is adapted for actuation by the cam and the other end of which is attached to the connecting-rod 32, as shown. By means of this construction and arrangement of parts a four-motion action is obtained for advancing the blocks to the knives in the manner well understood. 33, Fig. 1, represents a follower-block; 34, a cord; 35 and 36, pulleys, and 37 a weight by means of which the blocks are advanced toward the feeding mechanism proper. 38 38, Fig. 10, represent spring-plates resting upon the blocks; and 39, Fig. 4, bearing-blocks which are adjustably held in contact with the stick-blocks by levers, as shown. The machine, it will be observed, is adapted to cut the sticks from two rows of blocks at one operation.

*Sixth, the independent perforated plates and the mechanism for feeding the same.*—40, Figs. 3, 14, and 23, represent an independent perforated plate, which is provided with the catch 41, Fig. 23, by means of which the plates are united in a continuous series, as shown in Fig. 3. These plates are provided with a series of perforations, which perforations are beveled upon the lower side of the plate for the purpose of facilitating the introduction of the match-sticks. 42 represents a frame-piece journaled in proper bearings, as shown in Figs. 14, 15, and 16. 43 represents a lever-arm, and 44 a connecting-rod by means of which the end of the lever-arm is united to to the cutter-head in any suitable manner. 45 represents a shaft, having pusher-bars 46 rigidly attached thereto at proper points, the free ends of which are adapted to engage with the perforations, as shown in Figs. 3 and 14. 47 and 48 represent adjusting-screws by means of which the position of the shaft and pusher-bars is adjusted in relation to the frame-piece 42 in such manner as to cause the accurate registration of the ends of the pusher-bars with the openings in the plates. 49, Figs. 14 and 15, represent a slotted stud or block by means of which the pusher-bars are held accurately in their proper lateral positions. 50, Fig. 16, represents a curved plate having bearing-surfaces adapted to rest upon the upper sides of the perforated plates, near their edges, as shown. 51 represents a spring-plate held at its ends by the set-screws 52, as shown. The center of this spring-plate rests upon the center of the curved plate, as in Fig. 16. By means of the adjusting-screws the amount of pressure upon the plates may be determined at will. 53, Figs. 14 and 15, represents a brace-beam which is adapted to furnish a proper support for the perforated plates. The matchsticks are thrust into the same by the action of the cutter-head.

The general operation of the parts is as follows: Motion having been communicated to the machine, the cutter-head is caused to have vertical reciprocation between the standards 2 and 3. By the downward movement of the cutter-head a row of match-sticks is cut from the prepared stick-blocks, which are presented to the cutters on diagonal lines. In the act of completing the cutting action the openings in the cutters are caused to move over the pins in block 28, for the purpose of entering the sticks held in these openings into the cutter a sufficient distance to remove their base ends from the range of action of the abutment-block. The abutment-block then at the proper time is moved in beneath the cutters by the action of the plate 25, having the cam-slot, as shown, and the lever 23 with pin 24. In this position of the abutment-block the base ends of the sticks held in the cutters are properly supported. By the upward movement of the cutter-head the row of match-sticks cut from the block in the descending movement is carried up and inserted in the corresponding row of openings in the perforated plate, which is in position above the cutter-head. The upper ends of the match-sticks are properly directed in their entrance into the openings in the perforated plates by the guide-plate 27. The entrance also of the sticks into the openings of the plate is facilitated by the beveled form of the same. The plate itself is properly held against the thrust action of the cutter-head in the introduction of the match-sticks by the brace-beam 53. The matchsticks, in the upward movement of the cutter-head, are held firmly in position against the base of the grooves of the grooved supporting-plate by the peculiar construction of the cutters. The prepared stick-blocks are advanced in two rows to the cutters on diagonal lines, and are held in their movement by proper springs, which bear upon the upper surfaces of the same, as shown. By presenting the blocks to the action of the cutters on diagonal lines it is possible to cut the block without material waste, because the projecting portions of the block left by the cutters in one descending movement are presented to the action of the cutters in the next descending movement, the block itself being advanced at this time into the proper position to permit this action. The perforated plates are advanced by the action of the pusher-bars 46, with an intermittent movement which is made in harmony with the movement of the cutter-head. These plates are properly held in their movement by the spring-pressure plate 50.

Having thus fully described our invention, what we claim as new, and desire to secure by Letters Patent, is—

In combination with the abutment-block 21, the supporting-ways 22, the lever 23, having the pin 24, and the cam-plate and slot, as described.

This specification signed and witnessed this 20th day of March, 1889.

OHIO C. BARBER.
   JOSEPH A. BAUGHMAN.
   McCLINTOCK YOUNG.

Witnesses for Barber and Baughman:
 JAMES HOPKINS,
 HENRY K. SAUDER.

Witnesses for Young:
 J. K. ROBINSON,
 H. S. MORROW.

It is hereby certified that the assignee, "The Diamond Match Company," in Letters Patent No. 416,888, granted December 10, 1889, upon the application of Ohio C. Barber and Joseph A. Baughman, of Akron, Ohio, and McClintock Young, of Frederick, Maryland, for an improvement in "Machines for Making Match-Sticks," should have been described and specified as *The Diamond Match Company, of Akron, Ohio, a corporation of Connecticut*, instead of "The Diamond Match Company, of Ohio;" and that the said Letters Patent should be read with this correction therein that the same may conform to the record of the case in the Patent Office.

Signed, countersigned, and sealed this 11th day of July, A. D. 1893.

[SEAL.]
JNO. M. REYNOLDS,
*Assistant Secretary of the Interior.*

Countersigned:
JOHN S. SEYMOUR,
*Commissioner of Patents.*